United States Patent [19]
Lapeyre

[11] 3,744,406
[45] July 10, 1973

[54] SHRIMP FEEDING AND COOKING APPARATUS

[75] Inventor: James Martial Lapeyre, New Orleans, La.

[73] Assignee: The Laitram Corporation, New Orleans, La.

[22] Filed: Feb. 28, 1972

[21] Appl. No.: 229,632

[52] U.S. Cl. .................................. 99/516, 17/71
[51] Int. Cl. ......................................... A47j 27/04
[58] Field of Search .................... 99/516, 357, 404, 99/405, 407, 420, 443 C; 198/131, 160, 161; 15/3.12, 3.13, 3.14, 3.15, 3.16, 3.21; 17/73, 72, 71; 134/71, 73, 104

[56] References Cited
UNITED STATES PATENTS

| 3,024,822 | 3/1962 | Wilson et al. | 99/516 X |
| 3,383,734 | 5/1968 | Lapeyre | 17/73 |
| 2,574,044 | 11/1951 | Lapeyre et al. | 17/73 |
| 2,839,179 | 6/1958 | Buck | 198/131 |

*Primary Examiner*—Leon G. Machlin
*Attorney*—Wilkinson, Mawhinney & Theibault

[57] ABSTRACT

The present disclosure is directed to a shrimp feeding and cooking apparatus in which the feed tank has a frame assembly pivotally mounted at an upper discharge end and which frame is positioned to support at an inclination an endless conveyor, a feed paddle over the conveyor and a cooker over the conveyor upstream of the feed paddle. The frame assembly and the elements carried thereby are swingable about the pivot to remove everything clear of the feed tank.

9 Claims, 7 Drawing Figures

SHRIMP FEEDING AND COOKING APPARATUS

THE PRIOR ART

The broad combination of a feeder tank having an inclined conveyor and a feed paddle is shown in FIG. 14 of U. S. Pat. No. 2,574,044 and to this combination was added a cooker as shown in FIG. 2 of U. S. Pat. No. 3,383,734.

An object of the present invention is to provide a frame assembly which is pivoted at the top of the feeder tank so that the conveyor may be moved clear of the tank for scrubbing and cleaning as well as rendering the cooker movable relative to the conveyor for cleaning or using the tank and conveyor for processing either raw or cooked shrimp on the conveyor.

Another object of the invention is to provide an endless mat type conveyor for shrimp made up from pivoted modular links which cooperate with sprockets on a square shaft which sprockets may shift laterally along the shaft on which they are carried to accomodate for thermal expansion incident to passage of the conveyor through the cold water of the feed tank and through the heat zone beneath the cooker.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
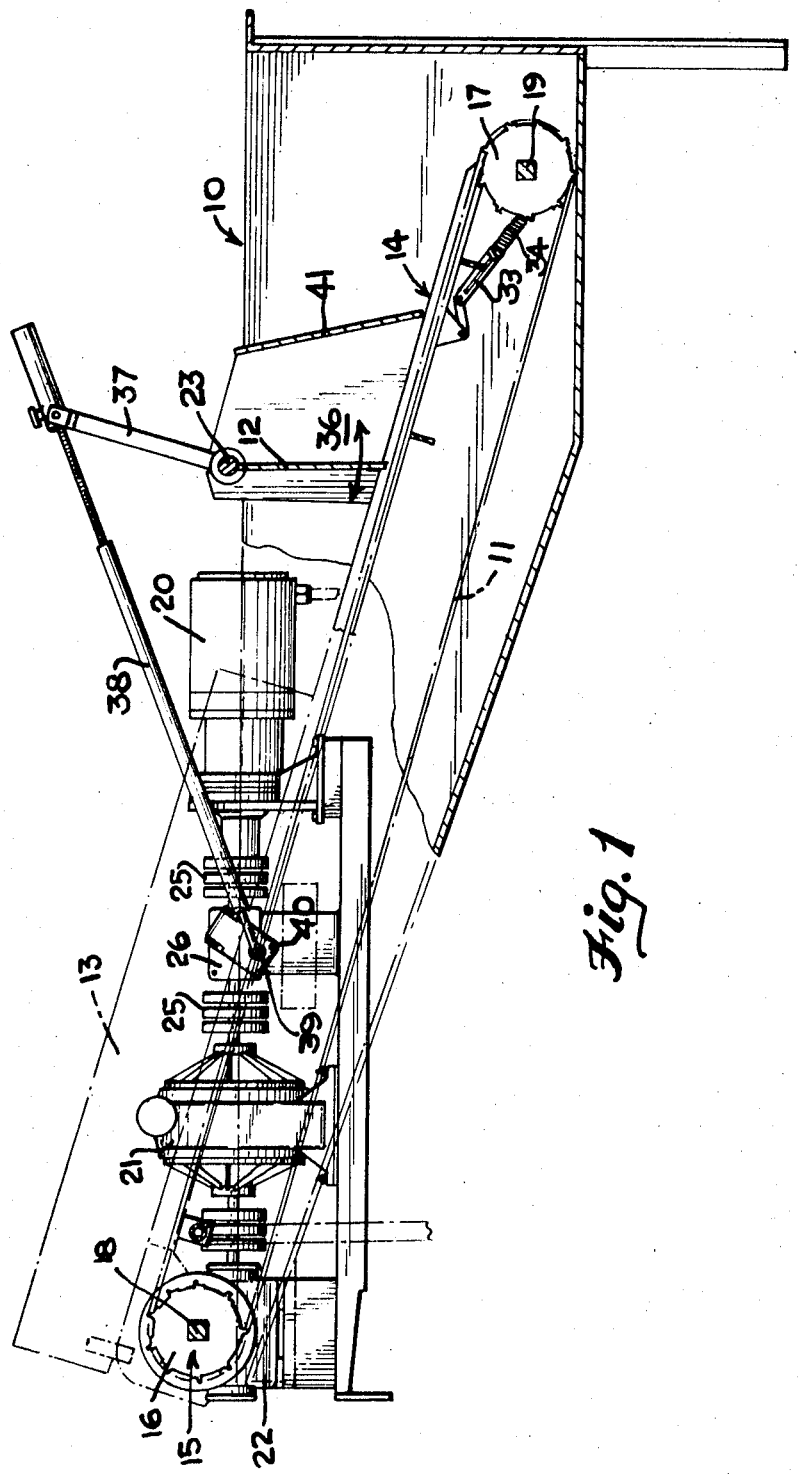
FIG. 1 is a longitudinal vertical sectional view with parts broken away and parts shown in section of the apparatus of the present invention having parts shown in solid line, section line and chain line.

Referring now to the drawings and for the moment to FIG. 1, 10 designates a shrimp feeder tank having an inclined endless conveyor 11, with an oscillating feed paddle 12 above the conveyor 11 and a cooker 13 above the conveyor 11 upstream of the paddle 12. The improvement of the present invention is directed to a frame assembly 14 pivoted at 15 to the upper end of the feeder tank 10 for movement into and out of the tank, between the position of FIG. 1 and FIGS. 3 and 4. There are sprocket means 16 and 17 on each end of the frame assembly for supporting the endless conveyor 11, there are sprockets carried on square shafts 18 and 19 compelled to rotate therewith. There is a drive motor 20 on the upper end of the frame for driving the endless conveyor 11 through a gear reducer 21 and gear box 22. The feed paddle 12 is mounted at 23 on the frame assembly for swinging movement above the conveyor 11. A cooker 13 is pivotally mounted at 24 on the frame 14 for movement relative to the conveyor 11 upstream of the paddle 12.

THE DRIVE TRAIN

The electric drive motor 20 drives a shaft through couplings 25 on each side of a drive converter 26 and thence through the speed reducer 21 through coupling 27 thence through the right angle worm and gear box 22 to the square shaft 18.

Figure 7:
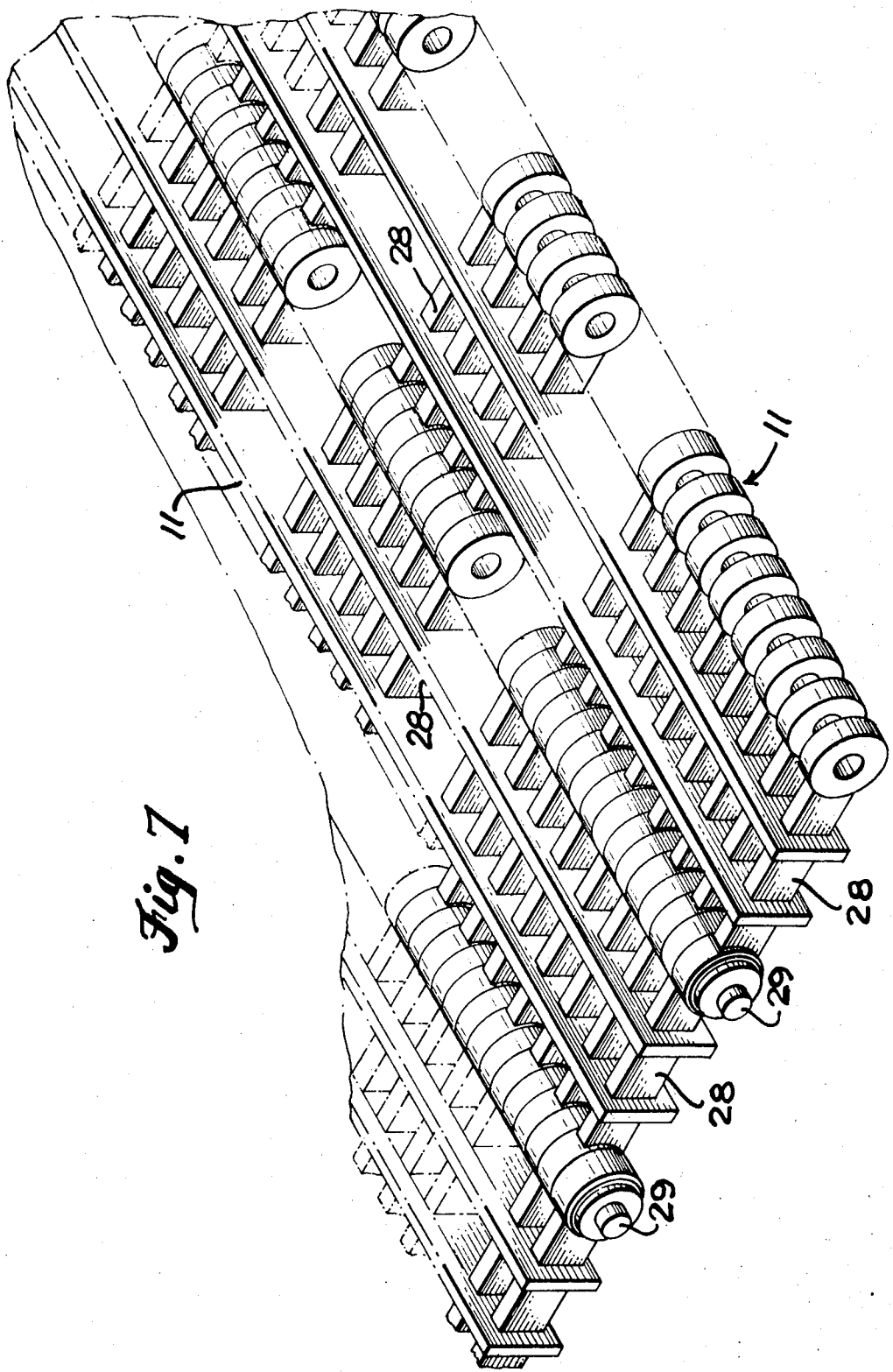
FIG. 7 is a perspective view of a section of the conveyor employed with the present invention.

The endless conveyor 11 is made up of pivoted link modules 28 joined by pivot rods 29 as best seen in FIG. 7. This conveyor is shown and described in detail in my copending application Ser. No. 63,523 filed Aug. 13, 1970.

Figure 4:
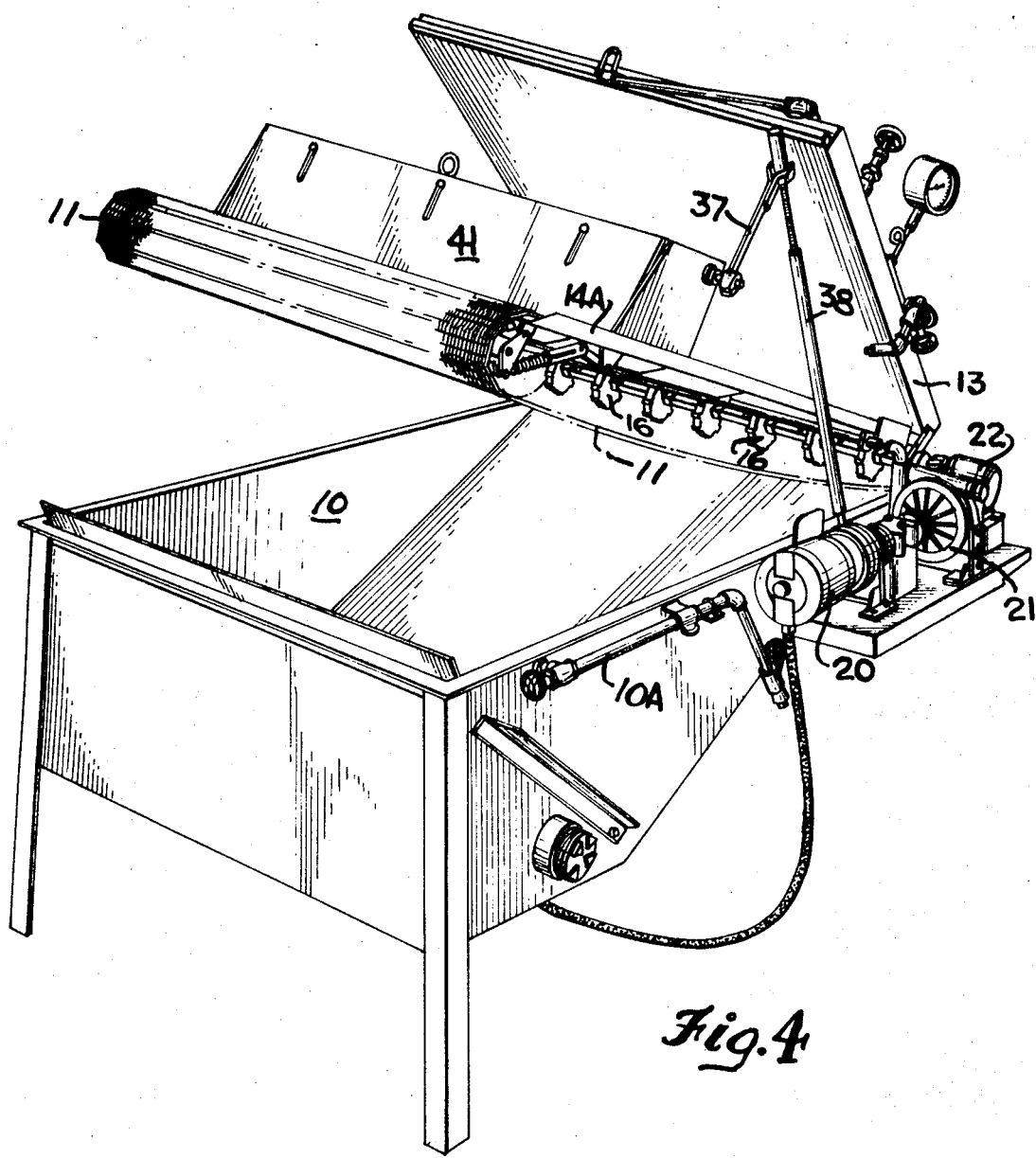
FIG. 4 is a rear perspective view of the apparatus of FIG. 3.

Cooperating with the endless conveyor 11 are sprockets 16 and 17 which have square hubs and are carried by and compelled to rotate with square shafts 18 and 19; 18 being driven by the output of worm gear box 22 while 19 is mounted for free rotation. As best seen in FIG. 4, there are a plurality of sprockets 16 spaced along shaft 18 to mesh with the adjacent openings in the modular link belt 11. One or more of the sprockets 18 are secured against movement along the square shaft 18 while the other sprockets on that shaft are free to move along the shaft as dictated by thermal expansion and contraction of the conveyor 11 in its movement from cold water in feeder tank 10 to the steam cooker 13 giving a wide range of thermal variance.

Figure 5:
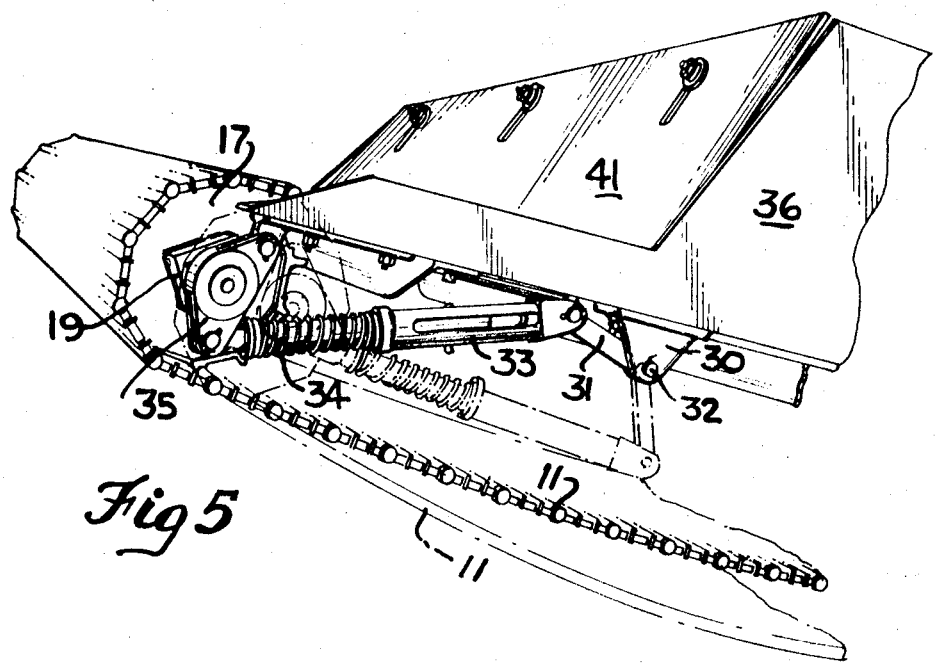
FIG. 5 is a fragmentary perspective view of the rear of the conveyor taken at an enlarged scale.

The lower end of conveyor 11 supported on the frame assembly 14, as best seen in FIGS. 4 and 5, has a spring loaded tensioning device which comprises at each side of the frame assembly 14, a lobe 30 to which a link 31 is pivoted at 32 and which link has a telescopic arm 33 under loading of coil spring 34 to cause the plate 35 to shift the square shaft 19 carrying sprockets 17 and the lower portion of the endless conveyor mat 11 to move between the solid line and chain line position.

SHRIMP FEED

The feed paddle 12 is secured to a rock shaft 23 journaled for swinging movement in side plates 36. Extending off the upper quadrant of shaft 23 is a rocker arm 37 which is pivotally connected to a variable length pitman drive arm 38 the other end of which is pivotally connected at 39 to a drive plate 40 driven by drive converter 26. Secured to the rear of the side plates 36 is a baffle 41, the lower extremity of which terminates spaced above the endless conveyor 11. The rotary motion of plate 40, through arms 38, 37 imparts a swinging motion to the paddle 12 as shown by the arrows. The amount of throw of each swing is controlled by shortening or lengthening the variable arm 38 which is threaded to permit of a variable throw. The throw of the paddle determines the quantity of shrimp which the paddle by wave action deposits on the conveyor mat 11 between the paddle 12 and cooker 13.

Figure 2:
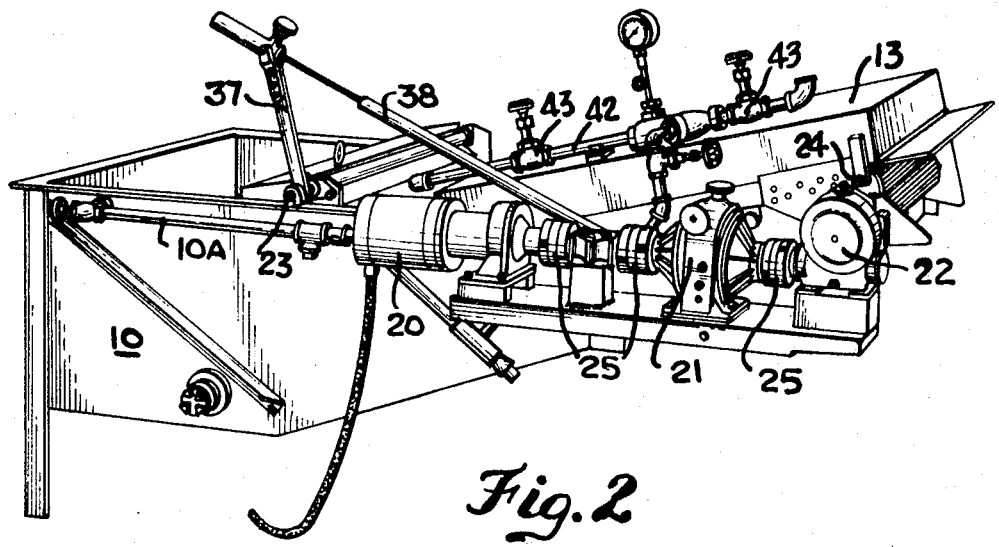
FIG. 2 is a front perspective view of the apparatus of the present invention.
Figure 3:
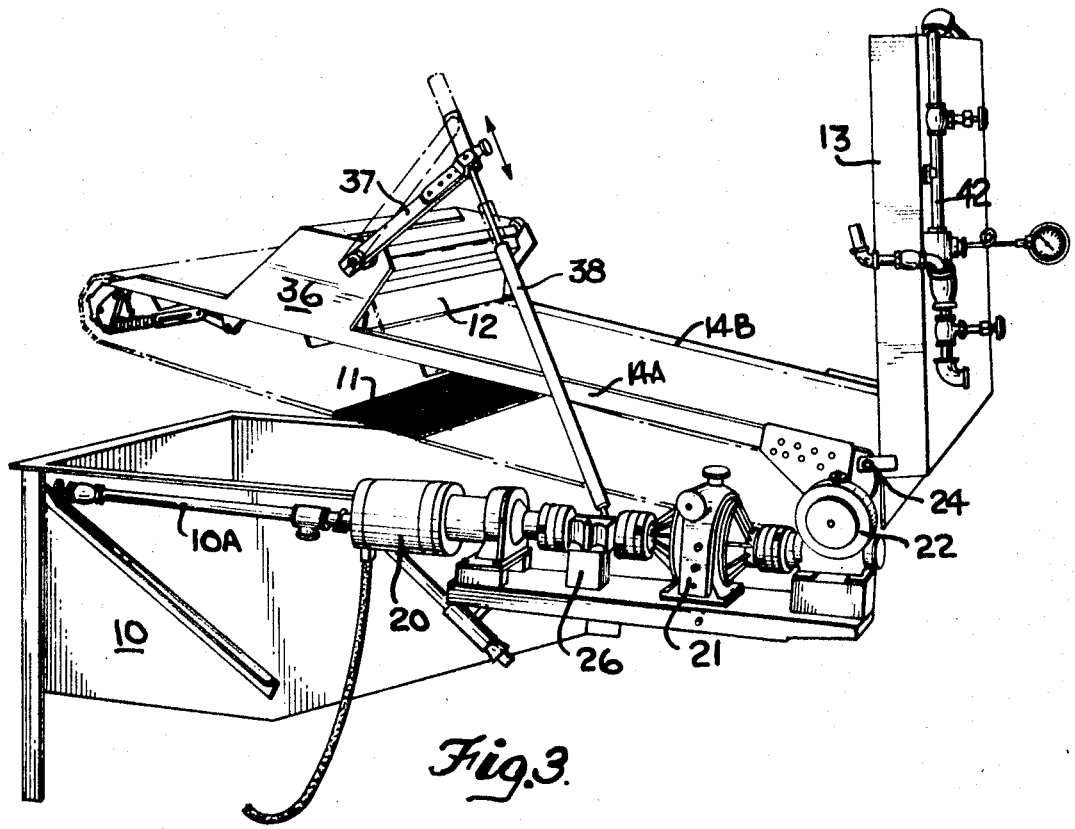
FIG. 3 is a view similar to FIG. 2 with the conveyor and cooker elevated.

The cooker 13, as best seen in FIGS. 2, 3 and 4 is a box like structure having an open bottom and being supplied with steam through lines 42. The cooker 13 is shown in its down or cooking position, in FIG. 2, to cook shrimp carried on the conveyor mat 11 which pass beneath its open bottom. The unit is shown raised in FIG. 3, where it has pivoted about its pivotal connection 24 to permit cleaning of the unit. In accordance with conventional practice a steam line is connected to the steam manifold 42 and is controlled by valves 43.

Figure 6:
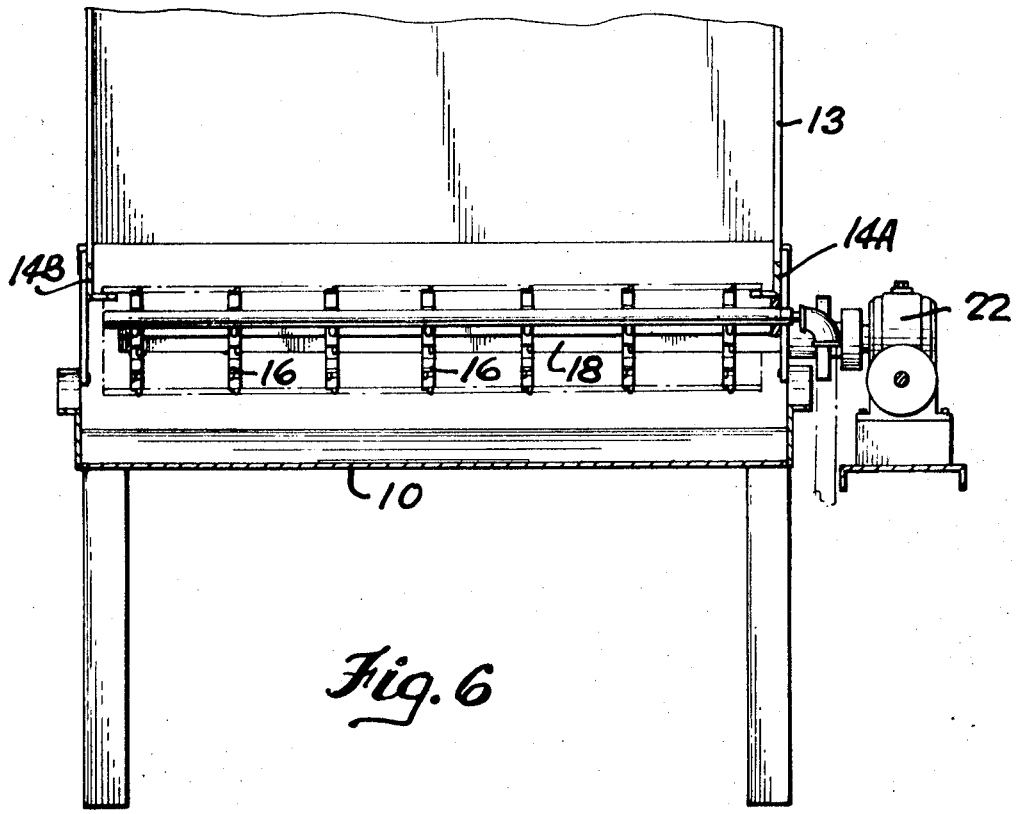
FIG. 6 is a transverse section taken through the front drive portion.

The endless conveyor is carried by the frame assembly 14, which as best seen in FIG. 6, has a pair of longitudinal angle iron runners 14A and 14B. The frame has plates secured at each end for journaling the square shafts and supporting same as well as providing for the upper pivot 15 which permits the entire conveyor mat and assembly of the paddle and cooker to be moved from the down or operating position of FIGS. 1 and 2 to the raised or cleaning position of FIGS. 3 and 4.

IN OPERATION

The frame assembly 14 and the paddle assembly 12 and cooker unit all of which are connected together are placed in their lowered position, best seen in FIGS. 1 and 2. The feed tank 10 is then filled with water to its overflow line 10A. The shrimp to be cooked are dumped into the tank 10 rearwardly of the baffle 41. The motor 20 is started which drives the endless conveyor mat 11 and starts the paddle 12 to swing back and forth causing a wave like action in the water to deposit the shrimp into the conveyor mat 11 between the cooker 13 and the paddle 12. The shrimp pass beneath the cooker and with the steam valves 43 open the shrimp are cooked while being conveyed to the high end of the mat conveyor from which they are removed for further processing or use.

What is claimed is:

1. For use with a shrimp feeder tank having an inclined endless conveyor, an oscillating feed paddle above said conveyor and a cooker above said conveyor upstream of said paddle the improvement comprising a frame assembly pivoted at the upper end of said feeder tank for movement into and out of said tank, means on each end of said frame assembly for supporting said endless conveyor, drive means on the upper end of said frame for driving said conveyor, feed paddle mount means on said frame assembly positioned above said conveyor, and cooker means carried by said frame upstream of said paddle above said conveyor and pivoted for movement relative to said conveyor.

2. An apparatus as claimed in claim 1 further comprising baffle means carried by said frame assembly downstream of said feed paddle above said conveyor.

3. An apparatus as claimed in claim 1 wherein said endless conveyor is a mat made up of plastic modules pivotally connected end to end and side by side defining drive openings therebetween.

4. An apparatus as claimed in claim 3 wherein said drive means for said conveyor comprises a motor driven square shaft, sprockets mounted on said shaft some of which are slidable along the axis of said shaft while being compelled to rotate with said shaft and at least one of said sprockets being fixed axially on said shaft and sprocket teeth about the periphery of said sprocket to engage the endless conveyor mat through said drive openings to drive said mat.

5. An apparatus as claimed in claim 1 further comprising drive means in train with said conveyor drive to oscillate said feed paddle.

6. The apparatus of claim 1 wherein said endless conveyor is formed primarily of non-metallic (organic) plastic material.

7. The apparatus of claim 1 wherein the means for supporting the lower end of said endless conveyor is a sprocketed idler shaft journaled in said frame assembly.

8. The apparatus of claim 7 wherein said conveyor belt is free to move laterally along the axis of said idler shaft relative to one or more of said sprockets.

9. The apparatus of claim 1 wherein the conveyor belt has a belt-tensioning member on each end of said idler shaft.

* * * * *